United States Patent [19]
Burgess

[11] 3,940,572
[45] Feb. 24, 1976

[54] POWER SUPPLY FOR KEY TELEPHONE SYSTEM

[75] Inventor: Robert L. Burgess, Upland, Calif.

[73] Assignee: Dracon Industries, Chatsworth, Calif.

[22] Filed: Apr. 24, 1974

[21] Appl. No.: 463,439

[52] U.S. Cl. .............................. 179/77; 317/33 VR
[51] Int. Cl.² ........................................ H04M 19/00
[58] Field of Search ............ 179/99, 77, 81 R, 16 A, 179/16 F; 317/33 VR; 323/20, 22 T

[56] References Cited
UNITED STATES PATENTS

| | | | |
|---|---|---|---|
| 3,366,871 | 1/1968 | Connor | 323/9 |
| 3,691,426 | 9/1972 | Mankovitz | 317/23 |
| 3,721,894 | 3/1973 | Beckwith | 323/20 |
| 3,743,887 | 7/1973 | Keough et al. | 317/16 |
| 3,748,403 | 7/1973 | Schartmann et al. | 179/99 |
| 3,764,752 | 10/1973 | Yachabach | 179/81 R |
| 3,801,894 | 4/1974 | Spiegel | 323/9 |

*Primary Examiner*—Thomas W. Brown
*Attorney, Agent, or Firm*—Flehr, Hohbach, Test, Albritton & Herbert

[57] ABSTRACT

A power supply for a key telephone system provides regulated dc for the talk and relay circuits and various ac voltages for buzzer, lamp and ringer signaling. The power supply visually indicates dc overload, and at the same time provides effective voltage regulation and is compact in size by the use of foldback current limiting.

1 Claim, 2 Drawing Figures

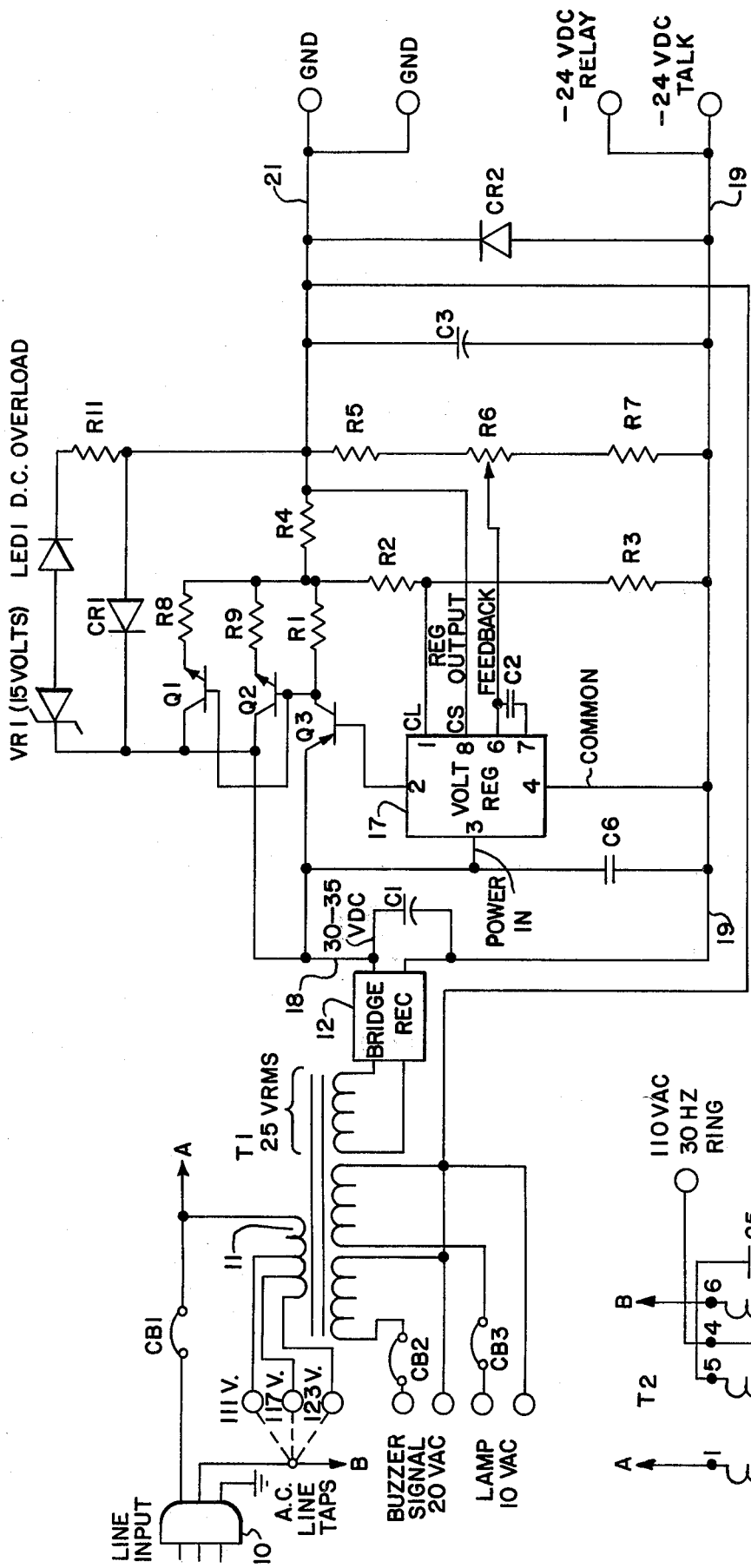
FIG.—2
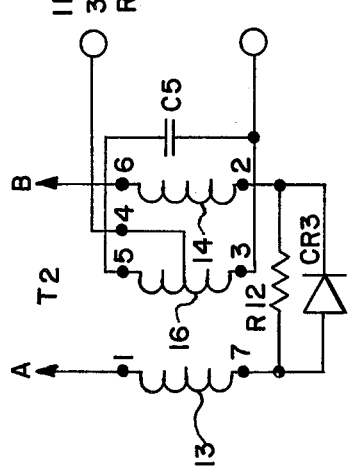
FIG.—1

POWER SUPPLY FOR KEY TELEPHONE SYSTEM

BACKGROUND OF THE INVENTION

The present invention is directed to a power supply for a key telephone system.

Present power supplies for key telephone systems must provide a variety of ac and dc voltages. These include a negative 24 volt dc talk and relay voltages which are carefully regulated and filtered, a 10 volt ac lamp voltage, a 20 volt ac buzzer signal and a 110 volt ac ring signal of half the line frequency or 30 Hz. Prior power supply units which would perform the foregoing functions were unduly bulky due in part to ferro-resonant ringing components, had relatively poor voltage regulation and required fusing to prevent short circuiting of many of the supply voltage sections.

OBJECTS AND SUMMARY OF THE INVENTION

It is, therefore, an object of the present invention to provide an improved power supply for a key telephone system which is of relatively small size and which produces all necessary voltages and has improved dc output voltage regulation.

In accordance with the above object, there is provided a power supply for a key telephone system having talk and relay circuits requiring a dc voltage and having lamps, buzzers and ringers requiring ac voltages. Foldback current means supply the dc voltage. Overload means include visual indicating means responsive to the dc voltage decreasing below a predetermined value for actuating the visual means. Transformer means supply a plurality of ac voltages for respective use with the lamps, buzzers, ringers and for supplying the dc foldback current means.

BRIEF DESCRIPTION OF THE DRAWINGS

FIGS. 1 and 2 are electrical schematics of a power supply embodying the present invention.

DETAILED DESCRIPTION OF THE PREFERRED EMBODIMENT

Now referring to both FIGS. 1 and 2, the line input is schematically indicated as a plug 10 which has a nominal voltage of from 111 to 123 volts rms. Primary 11 of a transformer T1 is connected to plug 10 by one of multiple taps which include 111, 117 and 123 volts. The three secondary windings of T1 respectively provide the 20 volt ac buzzer signal through circuit breaker CB2, a 10 volt ac lamp supply through circuit breaker CB3 and a 25 volt input to a bridge rectifier 12 to provide dc voltages for the talk and relay circuits of the key telephone system.

A 110 volt ac 30 Hz ring voltage is provided by a second transformer T2 coupled to terminals A and B of the line input 10 as indicated. Transformer T2 is actually a magnetic amplifier which includes primary windings 13 and 14 and a secondary winding 16. Primary windings 13 and 14 are series connected through a rectifier CR3 which is in parallel with a resistor R12. They are wound so that the respective fields are in opposition to one another. The primary to secondary turns ratio is approximately 1:2.5. The secondary tap is offset on winding 16 such that one third of the secondary voltage appears across the pins 3 and 4 and two thirds of the secondary voltage appears across pins 4 and 5.

In operation, the application of the 60 Hz line voltage across the whole of the primary winding, pins 1 and 6, produces back emfs in each of the primary half windings in opposition to each other, thus causing saturation in the transformer core material. Due to the presence of CR3, each primary half winding will alternately saturate the core and produce a differentiated current pulse in the loaded secondary winding 16 at one half the input frequency or 30 Hz. This will be current limited at a value determined by R12. Capacitor C5 resonates the inductance to provide a sinusoidal ring voltage.

Bridge rectifier 12 as discussed above has a 25 volt ac rms voltage applied to its input. This ac voltage is converted to full wave rectified dc. A capacitor filter C1 smooths the ripple content to produce on the positive side 18 of the line 30 to 35 volts dc unregulated. The remainder of the circuit is for the purpose of providing a regulated 24 volts dc. It includes a monolithic integrated voltage regulating circuit 17 which is connected to be foldback current limited. Such connection is well known in the art. The integrated circuit itself is available from National Semiconductor as LM376.

More specifically, the unregulated relatively positive dc voltage of 30 to 35 volts on line 18 is applied to the power input or pin 3 of the monolithic integrated circuit 17. In addition, line 18 is coupled to the emitter of transistor Q3 and the collectors of power transistor Q1 and Q2. The unregulated negative dc voltage on line 19 is applied to pin 4 and also provides for the final −24 volt dc relay and talk voltages. The current boosting output of the voltage regulator 17 occurs at pin 2 and is connected to the base of Q3. Such negative boost current is approximately 25 milliamperes maximum which is coupled to the relatively positive output or ground line 21 through resistors R1 and R4. Moreover, this current is amplified by power amplifiers Q1 and Q2 which are connected in a common collector configuration and supply through emitter swamping resistors R8 and R9 additional current to output line 21.

Diode CR1 connected between the collector of Q2 and line 21 insures against a possible positive back biasing of the voltage regulator 17. Diode CR2 connected to output lines 19 and 21 similarly insures against the possible back biasing of voltage regulator 17.

Voltage regulator circuit 17 includes a current limiting input, CL, which is coupled between voltage dividing network R2, R3 which selects the current foldback minimum value. A current sensing input on pin 8, CS, is connected to the regulated output of line 21 and resistor R4 which has a nominal resistance of 0.5 ohms which is the resistance of the current sensing function of the voltage regulator 17. Resistors R5, R6 and R7 are connected across output lines 19 and 21 and serve as a voltage dividing network which senses the output voltage and feeds it back on the feedback terminal of pin 6 of voltage regulator 17. Capacitor C2 is coupled from pin 6 back to pin 7 and provides for voltage compensation. This limits the frequency response of the regulator.

A built-in overload test is provided by a light emitting diode LED1 and a Zener diode VR1 which are series connected between output line 21 and unregulated input line 18. The light emitting diode provides a visual indication of short circuit conditions. In normal operation, since the input line 18 is at 30 to 35 volts and the output line 21 is at a positive 24 volts, the normal voltage difference will be approximately five to ten volts across the overload network. However, when the voltage on line 21 is reduced to 17 to 35 volts, due to the operation of the voltage regulator under overload or short circuit conditions, this will produce a sufficient voltage difference across Zener diode VR1 which will then conduct to activate LED 1.

In normal operation the dc voltage regulation takes place as follows. A greater load requires increased current on line 21 which will cause a voltage decrease. This is sensed by the divider R5, R6, R7, and the voltage input to pin 6 is reduced. The voltage regulator then responds by increasing $V_{out}$ at pin 2 to cause transistor Q3 to conduct more heavily. This in turn increases the base currents of Q1 and Q2 to provide a current boost and, therefore, increases the voltage to its nominal 24 volt value.

On the other hand, an increase in the voltage across the output terminals is sensed by voltage regulator 17 causing Q3 to conduct less, decreasing the base currents of Q1, Q2, and decreases the final output voltage.

Thus, an improved power supply for key telephone systems has been provided.

I claim:

1. A power supply for a key telephone system having talk and relay circuits requiring a dc voltage and having lamps, buzzers and ringers requiring ac voltage said power supply comprising: voltage regulator means having an output line for supplying said dc voltage including foldback current means for sensing an overload output current for decreasing said dc voltage to provide a foldback voltage operating characteristic; transformer means for supplying a plurality of ac voltages for respective use with said lamps, buzzers and ringers and for supplying said voltage regulator means, said transformer means including a first transformer having a primary winding connection to a line input and three secondary windings for respectively providing said buzzer and lamp voltages and for supplying voltage regulator means, and including second transformer means having a primary winding connection to said line input for producing a ring voltage; rectifier means having a dc output and an input connected to one of said three secondary windings for producing at its dc output an unregulated dc voltage, said dc output being connected to and supplying said voltage regulator means; and overload means for visually indicating when said dc voltage on said output line decreases below a predetermined value including a series connected Zener diode and light emitting diode both connected between said output line and said unregulated dc output, said light emitting diode being activated when a sufficient voltage difference across said Zener diode causes it to conduct.

* * * * *